United States Patent [19]
Canziani

[11] Patent Number: 4,781,281
[45] Date of Patent: Nov. 1, 1988

[54] CONVEYOR AND DISCHARGE SYSTEM FOR SORTING ITEMS

[76] Inventor: Francesco Canziani, Via Contardo Ferrini, 21, 21010 San Macario (Varese), Italy

[21] Appl. No.: 940,930

[22] Filed: Dec. 12, 1986

[30] Foreign Application Priority Data

Dec. 20, 1985 [IT] Italy ............................... 24227/85[U]

[51] Int. Cl.⁴ ............................................. B65G 37/00
[52] U.S. Cl. ..................................... 198/365; 198/802
[58] Field of Search ...................... 198/365, 802, 482.1, 198/362; 414/278, 398

[56] References Cited

U.S. PATENT DOCUMENTS 3,912,071 10/1975 Nielsen ................... 198/365
4,096,936 6/1978 Nielsen .................. 198/365 X
4,399,904 8/1983 Canziani ................. 198/854 X

FOREIGN PATENT DOCUMENTS 2111933 7/1983 United Kingdom ............... 198/365

Primary Examiner—Robert J. Spar
Assistant Examiner—Cheryl L. Gastineau
Attorney, Agent, or Firm—Ladas & Parry

[57] ABSTRACT

A conveyor system for sorting items has a conveyor and discharge system consisting of a rotatable belt on a carriage, as well as motor-driven devices at collecting stations to rotate the belt and effect discharge.

8 Claims, 2 Drawing Sheets

CONVEYOR AND DISCHARGE SYSTEM FOR SORTING ITEMS

BACKGROUND OF THE INVENTION

The present invention provides a conveyor and discharge system for a system for sorting items.

A known system for sorting items has a carriage with a revolving belt, which defines a conveyor plane on which the items to be sorted are put. The carriage is arranged to engage a device at a collecting station on a fixed path of the carriage to make the belt rotate and discharge the item. Such a carriage particularly fit for a system that sorts a great number of items by discharging them at a limited number of collecting stations would be useful.

PRIOR ART

There are other known systems for sorting items that define a plurality of conveyor planes moving along a fixed path for discharging the items at predetermined points (collecting stations) along the path. Examples of such known systems are described, for example, in the following patents or applications: U.S. Pat. No. 4,399,904; U.S. patent application Ser. No. 107,769 of 1979; Italian Pat. Nos. 937,134, 1,055,285, 1,055,845, 1,055,897, 1,092,781 and 1,122,898; and Italian Application Nos. 49558 A/74, 23416 A/80 and 21835 A/82.

Some of the other known systems are for sorting a few items to a great number of destinations, as, for instance, in post offices. In the sorting systems most recently designed for this, the conveyor consists of a plurality of individual, e.g. carriage units. The support for the item conveyed by each unit consists of a belt rotatable in either direction orthogonal to the direction of conveyance of the unit to discharge the item onto one side of the path of the conveyor unit or the other. In some of these known apparatuses, the belt is rotated by an electric motor mounted on the same unit or carriage as the belt. More specifically, low inertia motors controlled by a computer have been recently used to give the belt the rotational speed most suited to the nature of the conveyed item, the weight thereof, the forward speed of the carriage and of the sizes of both the item and the collecting station. Apparatuses of this kind are described in my Italian applications Ser. Nos. 25859 A/81, 21834 A/82, and 22482 A/82.

Others of the other known systems, e.g. systems for processing luggage in airports, are for sorting quite a few items to a limited number of the collection stations. Furthermore, in the former systems, the path of the carriage conveyor unit from the loading to the discharging i.e., collecting stations is predetermined, but in airport luggage processing, a special path is provided for the different pieces of luggage, according to the destination, time of departure of the flight, and kind of luggage. Still furthermore, in view of the great number of the conveyor units needed for processing the large amount of luggage, which is such that the conveyor units are kept in parking lots until they are sent to the discharge stations, there is a need being felt for conveyor units that are less expensive and require less maintenance, because they are not fitted with their own controls for the item-discharge belts.

SUMMARY OF THE INVENTION

To solve these problems, the present invention provides a conveyor and discharge system for sorting items, wherein the conveyor plane of a carriage consists of rotatable belt actuatable by a motor unit located at a discharge station. For this, the carriage has suitable link devices to the motor unit for revolving the belt on the carriage. This makes it possible to simplify to a great extent the construction of both the preferably-plural carriages and motor units and to reduce remarkably both the initial cost and the subsequent maintenance cost of the plant, i.e., sorting system.

BRIEF DESCRIPTION OF THE DRAWINGS

The present invention will now be described in detail, with special reference to the attached drawings, wherein.

DESCRIPTION OF THE DRAWN EMBODIMENTS

Figure 1:
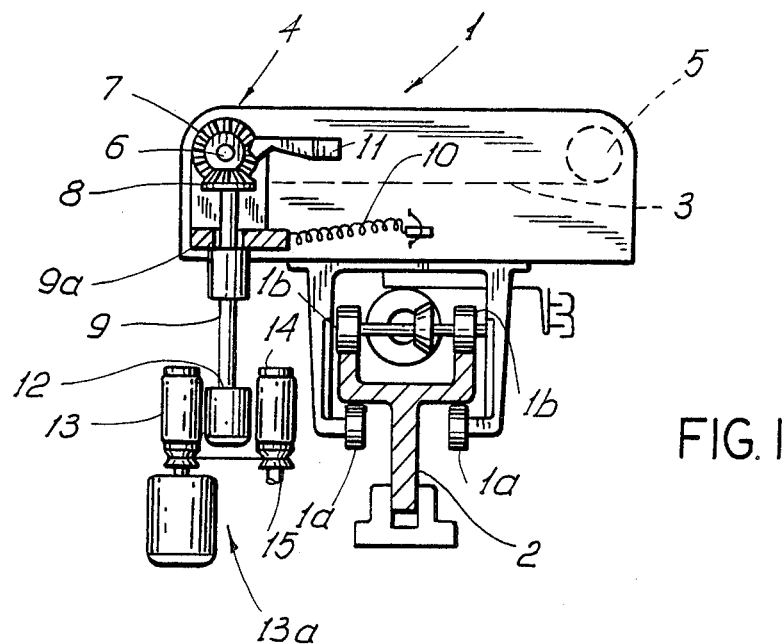
FIG. 1 shows a schematic end elevation of a carriage and motor unit according to the invention during discharge operation thereof, together with, partly in section, a portion of a sorting system therefor.
Figure 2:
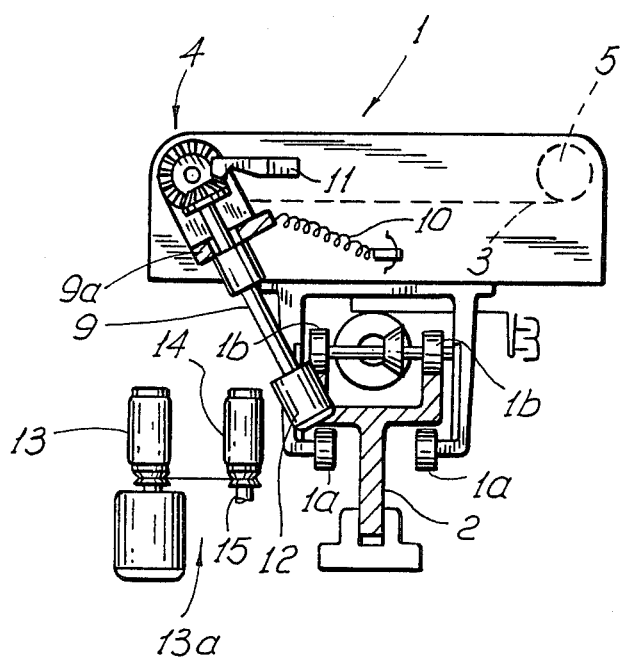
FIG. 2 shows a schematic end elevation like FIG. 1, but during conveyance operation.

The conveyor unit according to the invention consists substantially of a carriage at 1 provided with freely-rotatable wheels 1a and wheels 1b that are driven along guides, rails, or the like 2 to move the carriage in that direction. A belt 3 is rotatably mounted on the carriage by a pair of rolls 4 and 5. Of these, roll 4 is linked to rotation-driving mechanisms that are described hereinafter, whilst roll 5 is just a stretching roll. Belt 3 forms the conveyor plane on which are laid the items to be sorted.

Figure 3:
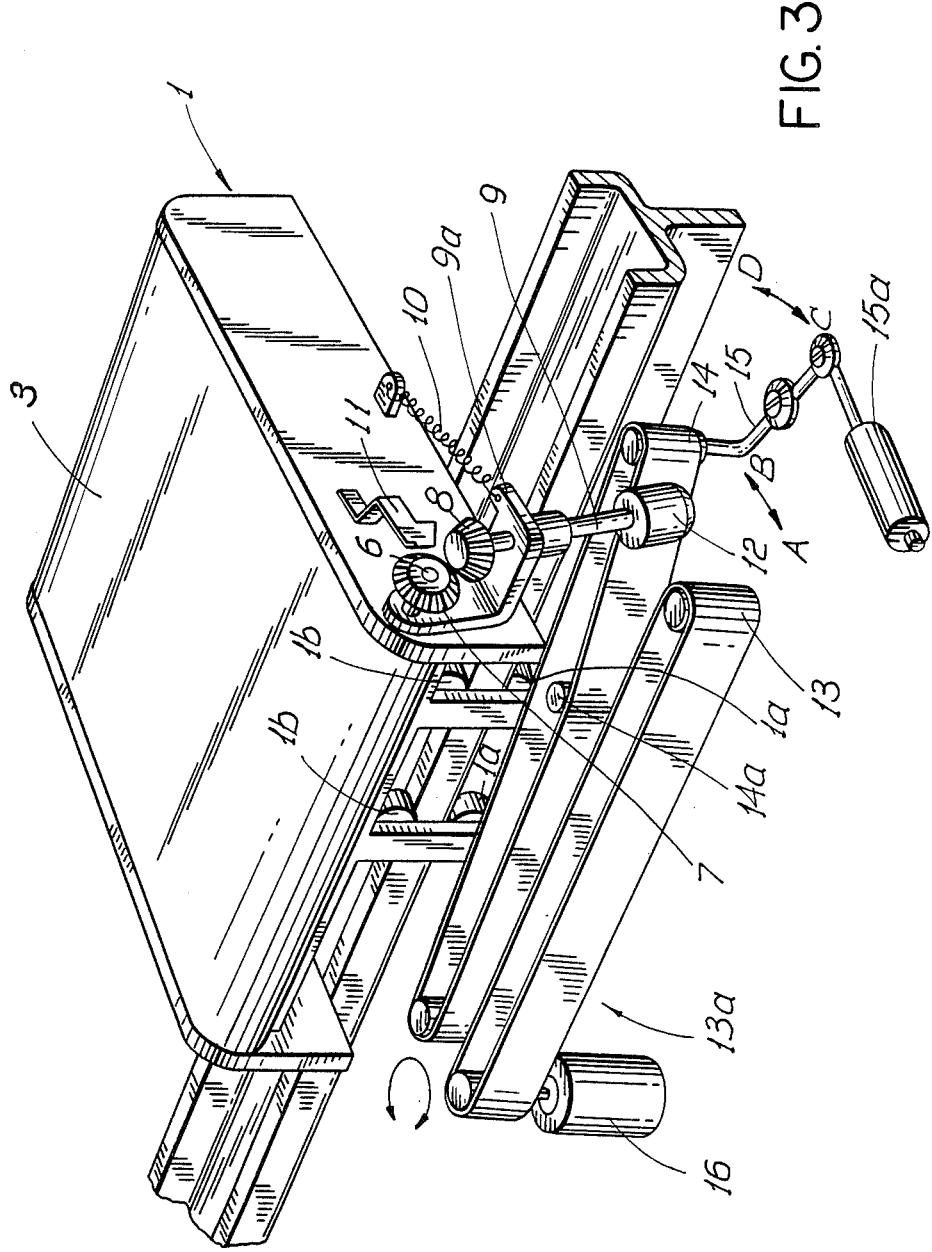
FIG. 3 shows a perspective, schematic [and partly exploded]view of the carriage, motor unit and portion of the sorting system of FIGS. 1 and 2.

A shaft 6 of roll 4 is keyed to a pinion 7, which engages a corresponding pinion 8, which is mounted on one end of a shaft 9 orthogonal to shaft 6. Shaft 9 is rotatably held in a bracket 9a pivoted on the carriage for limited angular displacements in the direction of arrow A-B (FIG. 3), i.e., transversely to the direction the carriage moves. Spring 10 acts between the bracket and the carriage so as to make the pinion or toothed wheel 8 continually engage a stop 11 on the carriage; thus, any rotation of shaft about its own axis is usually avoided. This avoids any movement of rotatable belt 3 and an item thereon, due to inertia of the conveyed item as the carriage moves along curved stretches of the rail and, consequently, rotation of the belt by friction with the item. A wheel or roll 12 is mounted on shaft 9 at its opposite lower end.

At the respective discharge stations (only one being shown) are located motor units at 13a (only one being shown) that act on the above-mentioned roll 12 and connected devices to control discharge of any item on the belt 3. These units respectively consist substantially of pairs of belts 13, 14, at least one of which may be rotated by an elected motor 16. Upstream of belts 13 and 14, relative to the movement of the carriage, there is a lever 15 centrally pivoted for movement transversely of the belts at its opposite ends, in the direction of arrow C-D, by an actuator 15a (FIG. 3) of known type connected to one end. Belts 13, 14 are at the same height as the wheel 12, the belt 14 being mounted, at one side, on the opposite end of lever 15.

Operation is as follows: the items to be sorted (not shown) are laid on the belt 3 of a conveyor unit such as that described above. The conveyor units e.g. carriage 1, which may be dragged by an externally-motorized puller (not shown) or self propelled, as shown, move along a path passing by the various discharge stations. All the devices that make up the apparatus are controlled by a central computer (not shown).

At the moment of loading, each carriage is given a code via proceedings of known type, so that the computer is informed every moment of the position of each conveyor unit along the path. When each conveyor unit passes through a predetermined discharge station, the computer operates the actuator 15a thereat to shift the lever 15 until belt 14 interacts with the wheel 12, which is thus pushed in the direction of arrow A, thereby disengaging the toothed wheel 8 from stop 11.

At this point, the shaft 9 can freely rotate around its own axis. As the carriage proceeds, belt 14 pushes the wheel 12 farther toward belt 13 until the wheel is seized between the belts 13, 14, and made to rotate by motor-rotated belt 13. This rotary motion is transmitted to the motor roll 4 via shaft 9 and the pair of pinion 7, 8 thus causing belt 3 to rotate and the item thereon to be discharged.

When the carriage is past the discharge station, wheel 12 disengages from between belts 13, 14, and spring 10 returns it to the starting position, wherein the mutual engagement between pinion 8 and stop 11 keeps belt 3 clamped.

Of course, there will be, too, provision for suitable reference means, e.g. roller 14a, connected with the parts of belts 13, 14 facing one another, to ensure a proper push contact between the belts and the wheel 12 during operation.

The described embodiment is of very simple construction, and turns out to be specially convenient for use in those sorting apparatuses comprising several conveyor units and few discharge stations. Consequently, both the cost and weight of the system tend to diminish considerably, as well as the required maintenance.

Obviously, the size as well as the employed materials may vary in accordance with the requirements of use.

I claim:

1. A conveyor and discharge system for a sorting system, comprising:
    a motor unit at a discharge station along a path; and
    a carriage movable along the path having a rotatable belt for conveying an item on the carriage as the carriage moves along the path and link means linking the rotatable belt to the motor unit when the carriage has moved along the path to the discharge station for revolving the rotatable belt with the motor unit, wherein:
    the motor unit comprises a motor and rotation means rotated by the motor; the carriage further comprises a roll on which the rotatable belt is mounted for revolving thereby; and the link means on the carriage comprises a rotatable shaft, gears respectively at one end of the shaft and roll rotatably engaging the shaft with the roll, a wheel on the other end of the shaft for frictionally engaging the rotation means for rotation thereby, whereby to revolve the belt, and stop means for avoiding rotation of the shaft and, thereby, the belt when the wheel is not engaged with the rotation means.

2. The conveyor and discharge system of claim 1, wherein the stop means comprises a stop on the carriage engagable with the gear on the shaft for preventing rotation thereof and a bracket pivotably mounting the shaft on the carriage for disengaging the gear on the shaft from the stop.

3. The conveyor and discharge system of claim 1 wherein the rotation means comprises a pair of rotatable belts for seizing the wheel between them.

4. The conveyor and discharge system of claim 2, wherein the rotation means comprises a pair of rotatable belts for seizing the wheel between them.

5. The conveyor and discharge system of claim 1, and further comprising actuator means connected to the rotation means for moving the rotation means out of a position for the frictional engagement of the wheel.

6. The conveyor and discharge system of claim 2, and further comprising actuator means connected to the rotation means for moving the rotation means out of a position for the frictional engagement of the wheel.

7. The conveyor and discharge system of claim 3, and further comprising actuator means connected to the rotation means for moving the rotation means out of a position for the frictional engagement of the wheel.

8. The conveyor and discharge system of claim 4, and further comprising actuator means connected to the rotation means for moving the rotation means out of a position for the frictional engagement of the wheel.

* * * * *